United States Patent [19]

Yamaoka et al.

[11] Patent Number: 4,989,701
[45] Date of Patent: Feb. 5, 1991

[54] SHOCK ABSORBER

[75] Inventors: Fumiyuki Yamaoka; Tamotsu Yamaura, both of Atsugi, Japan

[73] Assignee: Atsugi Motor Parts Company Ltd, Atsugi, Japan

[21] Appl. No.: 313,017

[22] Filed: Feb. 21, 1989

[30] Foreign Application Priority Data

Feb. 22, 1988 [JP] Japan .................................. 63-22172
Mar. 3, 1988 [JP] Japan .................................. 63-28589
Apr. 6, 1988 [JP] Japan .................................. 63-46493

[51] Int. Cl.⁵ ................................................ F16F 9/36
[52] U.S. Cl. .................................. 188/322.17; 188/315
[58] Field of Search ........... 188/315, 317, 318, 322.13, 188/322.16, 322.17, 322.22

[56] References Cited

U.S. PATENT DOCUMENTS 4,482,036 11/1984 Wossner et al. ................ 188/322.13
4,527,673 7/1985 Szcupak ...................... 188/322.17 X
4,542,811 9/1985 Miura .............................. 188/322.17

FOREIGN PATENT DOCUMENTS

48367/64 2/1966 Australia .
2111636 7/1983 United Kingdom ........... 188/322.17

Primary Examiner—Duane A. Reger
Attorney, Agent, or Firm—Bachman & LaPointe

[57] ABSTRACT

A shock absorber comprises a cylinder assembly defining a working chamber filled with a hydraulic working fluid and disposed therein a piston, and a fluid reservoir chamber filled with the hydraulic working fluid and a pneumatic working fluid, a communication path for connecting the working chamber and the fluid reservoir chamber for fluid communication therebetween, and a check and flow restriction assembly disposed within the communication path for selectively establishing and blocking fluid communication between the working chamber and the fluid reservoir chamber, the check and seal assembly includes a fluid check valve and a fluid flow restriction arranged in series, the flow restriction permitting pneumatic and hydraulic fluid flow directed to the fluid reservoir chamber during piston bounding stroke and providing flow restriction for the hydraulic fluid flow, and the check valve blocking fluid communication between the fluid reservoir chamber and the working chamber during piston rebounding stroke and permitting hydraulic fluid flow during the piston bounding stroke.

9 Claims, 5 Drawing Sheets

SHOCK ABSORBER

BACKGROUND OF THE INVENTION

1. Field of the Invention

The present invention relates to a shock absorber for an automotive suspension system. More specifically, the invention relates to a seal structure for a shock absorber for preventing a gaseous state working fluid in a fluid reservoir from leaking into a working chamber.

2. Description of the Background Art

Japanese Patent First (unexamined) Publication (Tokkai) Showa 58-156739 discloses a shock absorber which has coaxially defined inner and outer cylinders defining a fluid reservoir chamber in which hydraulic working fluid and pneumatic working fluid are filled, which fluid reservoir chamber is defined between the inner and outer cylinders. The disclosed shock absorber has a path for establishing a working chamber filled with a hydraulic working fluid and a the fluid reservoir chamber. A seal structure is provided in the path for permitting the hydraulic fluid from the working chamber to the fluid reservoir and blocking pneumatic fluid flow from the fluid reservoir to the working chamber.

In the conventional construction of the seal structure for such a type of the shock absorber, a seal member is provided for permitting and blocking fluid communication. Namely, in general, the hydraulic fluid pressure in the working chamber is higher than the pneumatic fluid pressure in the fluid reservoir chamber, and, alternatively, in the piston rebounding stroke, the pneumatic pressure in the fluid reservoir becomes higher than the hydraulic fluid pressure in the working chamber. Therefore, in the usual construction of the seal structure as disclosed in the Japanese patent First Publication 58-156739, one or more grooves are formed on the seal member so tat part of hydraulic working fluid in the working chamber can flow into the fluid reservoir only in the piston bounding stroke.

In such conventional seal structure, various drawback have been encountered. For example, when the seal member establishes the gas tight seal by face-to-face contact with a constructional seat member to seat thereof. Substantially high surface accuracy of the mating surfaces of the seal member and the seat member are required On the other hand, when the seal member is formed of a resin material, wearing of the resin seal member will cause leakage of the pneumatic working fluid into the working chamber to cause aeration.

SUMMARY OF THE INVENTION

Therefore, it is an object of the present invention to provide a shock absorber which can successfully prevent a pneumatic working fluid from leaking into a working chamber at any mode of shock absorber operation.

In order to accomplish aforementioned and other objects, a shock absorber, according to the present invention, comprises a cylinder assembly defining a working chamber filled with a hydraulic working fluid and disposed therein a piston, and a fluid reservoir chamber filled with the hydraulic working fluid and a pneumatic working fluid, a communication path for connecting the working chamber and the fluid reservoir chamber for fluid communication therebetween, and a check and flow restriction assembly disposed within the communication path for selectively establishing and blocking fluid communication between the working chamber and the fluid reservoir chamber, the check and seal assembly includes a check means and a flow restriction means arranged in series, the flow restriction means permitting pneumatic and hydraulic fluid flow directed to the fluid reservoir chamber during piston bounding stroke and providing flow restriction for the hydraulic fluid flow, and the check means blocking fluid communication between the fluid reservoir chamber and the working chamber during piston rebounding stroke and permitting hydraulic fluid flow during the piston bounding stroke.

The flow restricting means may comprise an orifice extending in axial direction defined between an outer periphery of a piston rod and inner periphery of the check means. The check means comprises a seal ring.

In the alternative, the check and flow restriction assembly comprises a seal ring and a retainer, and the flow restriction means comprises a radially extending groove cooperative with the retainer means for forming a flow restricting orifice serving the flow restriction means. The check and flow restriction assembly may also comprise a seal ring and a retainer, and the flow restriction means comprises a plurality of plate member disposed between the seal ring and the retainer for defining a flow restricting orifice.

According to another aspect of the invention, a shock absorber comprises:

a cylinder assembly defining a working chamber filled with a hydraulic working fluid and disposed therein a piston, and a fluid reservoir chamber filled with the hydraulic working fluid and a pneumatic working fluid;

a communication path for connecting the working chamber and the fluid reservoir chamber for fluid communication therebetween; and a check and flow restriction assembly disposed within the communication path for selectively establishing and blocking fluid communication between the working chamber and the fluid reservoir chamber, the check and seal assembly includes a check means and a flow restriction means arranged in series, the flow restriction means providing flow restriction against fluid flow therethrough, and the check means being responsive to pressure difference between the working chamber and the fluid reservoir chamber and responsive to higher pressure in the fluid reservoir chamber than that in the working chamber for elastically establishing flow blocking seal for blocking fluid communication between the fluid reservoir chamber and the working chamber and responsive to higher pressure in the working chamber than that in the fluid reservoir chamber for permitting hydraulic fluid.

The flow restricting means may comprise an orifice extending in axial direction defined between an outer periphery of a piston rod and inner periphery of a seal ring. The check means may also comprise an elastic seal elastically contacting the inner periphery of the communication path, the elastic seal being so designed that the pressure in the working fluid chamber is exerted onto the seal in a direction for releasing sealing contact between the elastic seal and the inner periphery of the communication path, and the pressure in the fluid reservoir chamber is exerted onto the seal in a direction for urging the seal onto the inner periphery of the communication path. In the alternative, the check means may comprise an elastic seal elastically contacting the inner periphery of the communication path, the elastic seal being geometrically oriented so that the pressure in the working fluid chamber is exerted onto the seal in a direction for releasing sealing contact between the elastic seal and the inner periphery of the communication path, and the pressure in the fluid reservoir chamber is exerted onto the seal in a direction for urging the seal onto the inner periphery of the communication path.

According to a further aspect of the invention, a shock absorber comprises:

- a cylinder assembly defining a working chamber filled with a hydraulic working fluid and disposed therein a piston, and a fluid reservoir chamber filled with the hydraulic working fluid and a pneumatic working fluid;
- a communication path for connecting the working chamber and the fluid reservoir chamber for fluid communication therebetween; and
- a check and flow restriction assembly disposed within the communication path for selectively establishing and blocking fluid communication between the working chamber and the fluid reservoir chamber, the check and seal assembly includes a check means and a flow restriction means arranged in series, the flow restriction means provided at an orientation closer to the fluid reservoir chamber than the check means and adapted for restricting hydraulic fluid flow therethrough for assisting generation of damping force in the working chamber, and the check means blocking fluid movable between a first and a second position depending upon pressure difference between the working chamber and the fluid reservoir chamber, the check means being responsive to the higher pressure in the fluid reservoir chamber than that in the working chamber to be placed at the first position for blocking communication between the fluid reservoir chamber and the working chamber, and responsive to the higher pressure in the working chamber than that in the fluid reservoir chamber for permitting hydraulic fluid flow.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
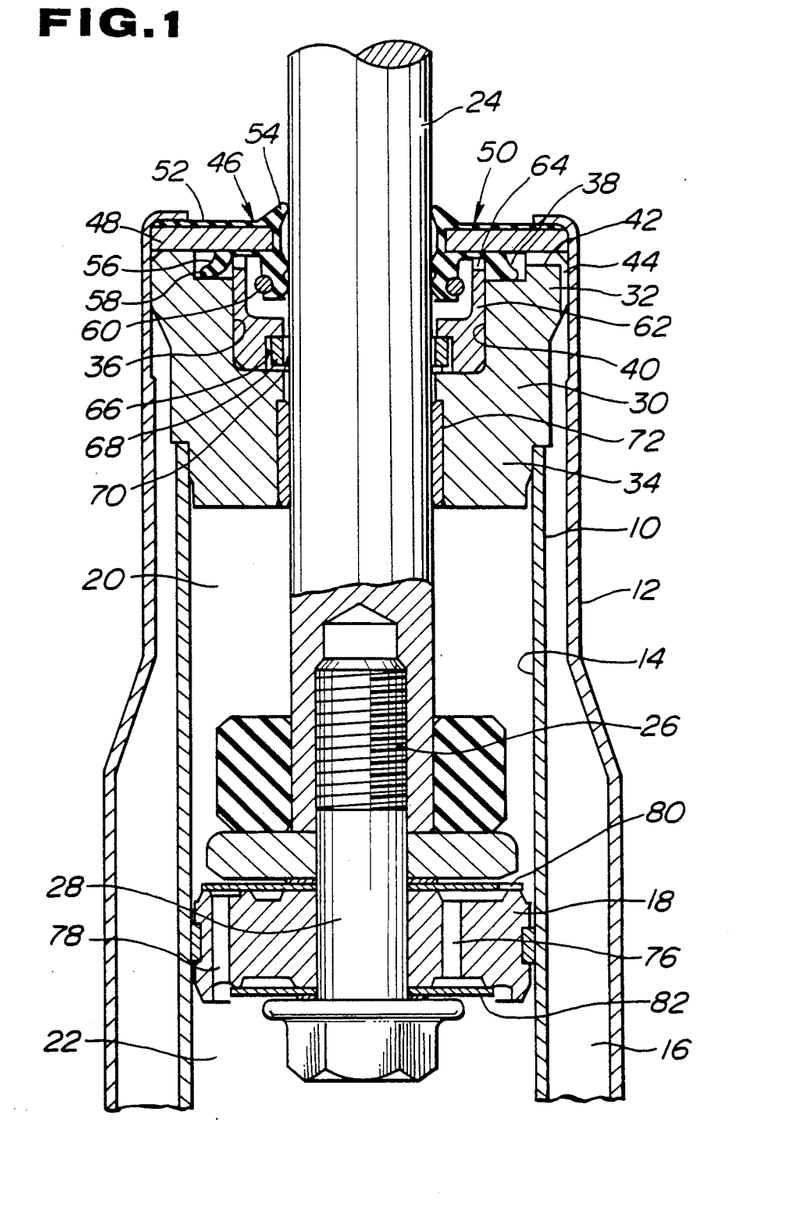
FIG. 1 is a section of the first embodiment of a major section of a shock absorber according to the present invention.

Referring now to the drawings, particularly to FIG. 1, the first embodiment of a shock absorber, according to the present invention, has coaxially arranged inner and outer cylinders 10 and 12. The inner cylinder 10 defines therein an internal space 14 filled with a hydraulic working fluid. The internal space 14 of the inner cylinder 10 serves as a working chamber. An annular chamber 16 is defined between the inner and outer cylinders 10 and 12. The annular chamber 16 is filled with a hydraulic fluid and a pneumatic fluid and serves as a reservoir chamber. A piston 18 is thrustingly and sealingly disposed in the working chamber 14 to separate the working chamber into an upper working chamber 20 and a lower working chamber 22. The piston 18 is fixedly secured onto the lower end section of a piston rod 24. In the shown construction, the piston rod 24 is formed with an axially extending threaded opening 26 to receive a fastening bolt 28. The piston rod extends from the inner and outer cylinders 10 and 12 through the top ends thereof In order to support the piston rod 18, an upper end plug 30 which serves as a piston rod guide, is fitted onto the top ends of the inner and outer cylinders 10 and 12. The upper end plug 30 has an upper larger diameter section 32 sealingly engaging with the inner periphery of the top end section of the outer cylinder 12. The upper end plug 30 also has a lower smaller diameter section 34 sealingly engaging with the top end of the inner cylinder 10. An upwardly opening recess 36 is formed in the upper end plug 30. The recess 36 comprises an upper larger diameter section 38 and a lower smaller diameter section 40. The upper end plug 30 is formed with a groove 42 having one end opening to the larger diameter section 38 of the recess 36 and the other end opening to the reservoir chamber 16. This groove 42 defines a communication path 44 for fluid communication between the reservoir chamber 16 and the recess 36.

The shock absorber has a check and seal assembly including a check means and a flow restriction means arranged in series.

A seal assembly 46 is provided above the upper end plug 30 for establishing liquid-tight and gas-tight seal between the outer periphery of the piston rod 24. The seal assembly 46 comprises an annular rigid reinforcement member 48 and an elastic seal 50. The elastic seal 50 has a section 52 fitted on the upper plane of the annular rigid member 48, an inner lip section 54 sealingly contacting with the piston rod 24, and an outer lip 56 contacting with the wall section 58 defining the larger diameter section 38 of the recess 36. The outer lip 56 serves as a check lip for permitting fluid flow from the upper working chamber 20 to the fluid reservoir 16 and blocking fluid flow in the opposite direction. As will be seen from FIG. 1, in the shown construction, the contacting point at which the outer lip 56 contacts with the wall section 58 is oriented at the lower elevation in relation to the opening end of the communication path in such a manner that the pressure transmitted through the fluid reservoir chamber 16 may serve to depress the outer lip 56 on the wall section 58 to enhance sealing contact therebetween. On the other hand, the inner lip 54 is biased toward the piston rod by a spring ring 60. The elastic seal 50 is made of a rubber material and vulcanized onto the rigid reinforcement member 48.

A seal housing member or retainer 62 is disposed in the recess 36. The seal housing member 62 has a lower portion engaging with the lower smaller diameter section 40 of the recess and extends upwordley to contact to the elastic seal 50 at the upper edge at an orientation between the inner and outer lips 54 and 56. A plurality of cut-outs 64 are formed in the upper edge of the seal housing member 62 for defining a through path for the fluid flowing between the upper working chamber 20 and the fluid reservoir chamber 16. An annular groove 66 is formed on the inner periphery of the lower section of the seal housing member 62. A seal ring 68 is disposed within the annular groove 66.

Figure 2:
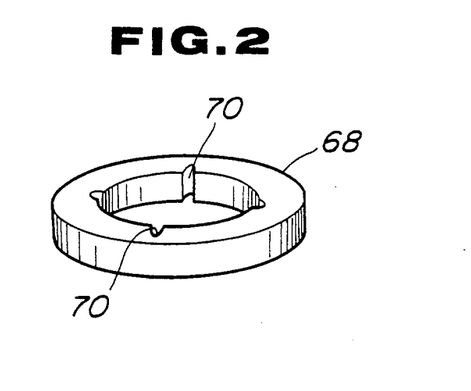
FIG. 2 is an enlarged perspective illustration of a sealing member.

As shown in FIG. 2, the seal ring 68 generally has an internal diameter substantially equal to the outer diameter of the piston rod 24 so as to establish sealing and sliding contact therebetweem. The seal ring 68 is formed with a plurality of axially extending grooves 70. In addition, a bearing sleeve 72 which has slightly greater internal diameter than the outer diameter of the piston rod 24 to define therebetween an annular clearance (though the clearance is not clearly shown in FIG. 1). Therefore, a space 74 defined between the seal housing member 62 and the seal assembly 46, which space is in fluid communication with the fluid reservoir chamber 16 via the communication path 44, the through path 64, is communicated with the upper working chamber 20 via the grooves 70 of the seal ring 68 and the clearance defined between the bearing sleeve and the piston rod 24.

On the other hand, the piston 18 is formed with a bounding communication path 76 and a rebounding communication path 78. The lower end of the bounding path 76 is closed by a leaf spring valve 80 which permits flow of the working fluid from the upper working chamber 20 to the lower working chamber 22 during piston bounding motion and blocks fluid flow in the opposite direction. On the other hand, the upper end of the rebounding communication path 78 is closed by a leaf spring valve 82 which permits fluid flow from the lower working chamber 22 to the upper working chamber 20 during the piston rebounding motion and blocks fluid flow in the opposite direction. With flow restriction provided by the communication path 76 and 78, resistance against displacement of the piston 18 is generated as damping force. This damping force serves for restricting relative displacement between the vehicular body and a suspension member as employed in the automotive suspension system.

On the other hand, in the piston bounding stroke, the fluid pressure in the upper working chamber 20 is increased according to the upward movement of the piston 18. This causes fluid flow from the upper working chamber 20 to the fluid reservoir chamber 16 via the clearance between the bearing sleeve 72, the grooves 70 of the seal member 68, the space 74, the through opening 64 and the communication path 44. For the fluid flowing from the upper working chamber 20 to the fluid reservoir 16, the grooves 70 in the seal member 68 serve as flow restricting orifices for limiting fluid flow therethrough and thus generates damping force.

On the other hand, in the piston rebounding stroke, the pressure in the upper working chamber 20 is decreased by expansion of the volume. On the other hand, the fluid in the lower working chamber 22 is compressed to flow into the upper working chamber 20 via the rebounding communication path 78 in a limited amount. The fluid pressure in the lower working chamber 22 is also transmitted to the hydraulic fluid in the fluid reservoir chamber to compress the pneumatic fluid Therefore, the pneumatic pressure at the upper section of the fluid reservoir is increased. This causes gas flow from the fluid reservoir chamber 16 through the communication path 44. However, the pressure transmitted from the fluid reservoir chamber 16 serves for increasing depression for the outer lip 56 onto the wall section 58 to establish gas tight seal therebetween. Therefore, the pneumatic fluid in the fluid reservoir chamber 16 will never leak into the upper working chamber.

Figure 3:
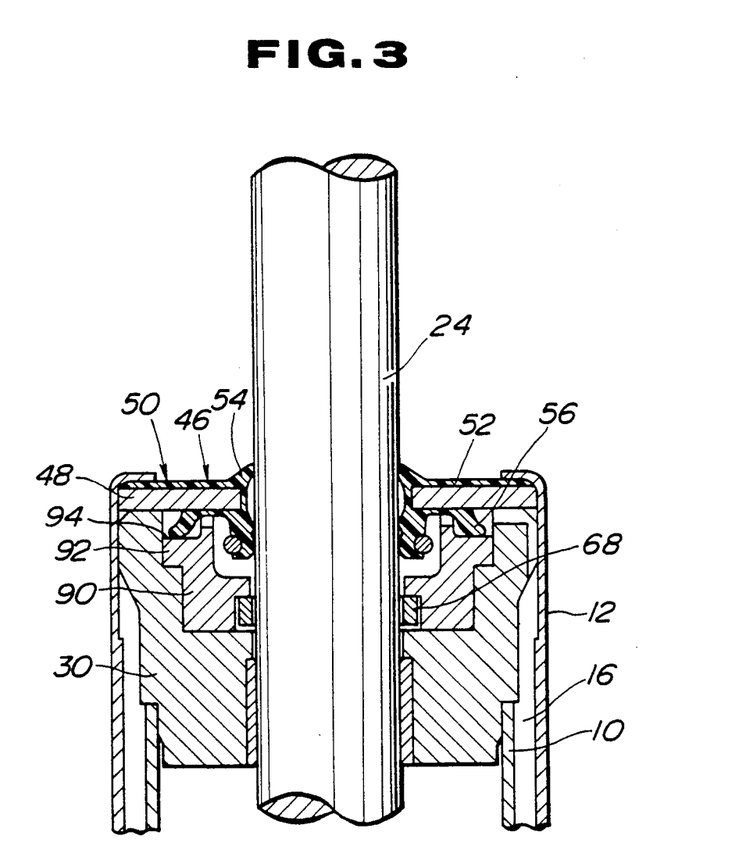
FIG. 3 is a section of the second embodiment of a major section of a shock absorber according to the invention.

FIG. 3 shows the second embodiment of the shock absorber according to the present invention. In the following discussion for the second embodiment, the component common to the foregoing first embodiment will be represented by the same reference numerals In this embodiment, the seal housing member 90 has the modified configuration to that disclosed in the former embodiment. In this embodiment, a seal housing member or retainer 90 is integrally formed with a flange section 92 which has a plane 94 mating with the outer lip 56 to serve as the wall section to cooperate with the outer lip to establish the gas tight seal.

With this construction, substantially the same effect to the foregoing first embodiment can be achieved.

Figure 4:
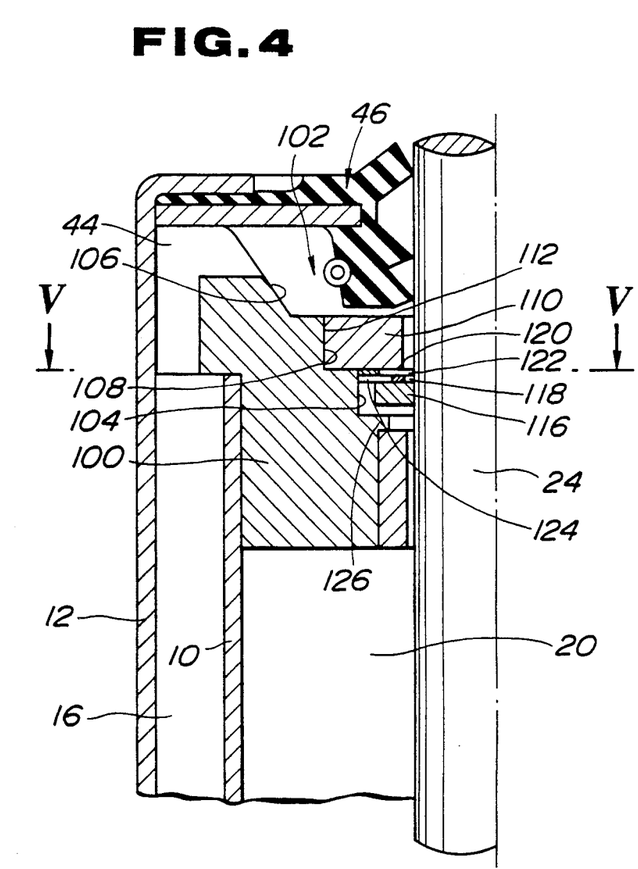
FIG. 4 is a section of the third embodiment of a major section of a shock absorber according to the invention.
Figure 5:
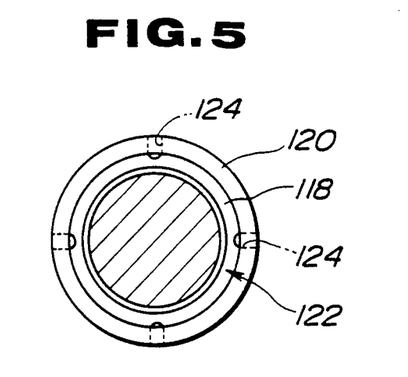
FIG. 5 is a plan view of a sealing member employed in the third embodiment of the shock absorber of FIG. 4.

FIG. 4 shows the third embodiment of the shock absorber according to the present invention. Similarly to the foregoing second embodiment, the components common to the foregoing first embodiment will be represented by the same reference numerals In the shown embodiment, an upper end plug 100 serving as the rod guide has stepped groove 102 defining the lowermost small diameter section 104, an uppermost large diameter section 106 and an intermediate section 108 between the lowermost and uppermost sections 104 and 106. A stationary ring member or retainer 110 is rigidly fitted to the intermediate section 108 and extends radially inward. This stationary ring member 110 is cooperative with the wall section 112 of the upper end plug 100 defining the lowermost section 104 to define a seal receptacle groove 114. In the seal receptacle groove 114, a seal ring 116 is disposed for thrusting movement in axial direction according to pressure difference between the fluid reservoir chamber 16 and the upper working chamber. In the seal receptacle groove 114, an orifice ring 118 and a spacer ring 120 are also disposed in axial alignment to each other. In the shown embodiment, the spacer ring 120 is placed in the uppermost orientation and the seal ring 116 is placed in the lowermost orientation. The orifice ring 118 is placed between the spacer ring 120 and the seal ring 116. The orifice ring 118 and the spacer ring 120 are provided substantially the same external diameters which substantially correspond to the internal diameter of the lowermost section 104. As shown in FIG. 5, the spacer ring 120 has greater internal diameter than the outer diameter of the piston rod 24 to define therearound an annular space 122. On the other hand, the orifice ring 118 has an internal diameter slightly greater than the outer diameter of the piston rod 24 but smaller than the internal diameter of the spacer ring 120. The orifice ring 118 is formed with a plurality of radially extending cut-outs 124, inner portions of which overlap with the annular space 122 defined by the spacer ring. On the other hand, the seal ring 116 has outer diameter greater than the internal diameter of a radially extending flange section 126 of the upper end plug 100.

With this construction, in the piston bounding stroke where the hydraulic working fluid in the upper working chamber is increased by compression of volume in the upper working chamber, the seal ring 116 is shifted upwardly and placed away from the flange section 126. Then, the working fluid in the upper working chamber 20 is permitted to flow through the path defined by the cut-outs 124 of the orifice ring 118 and the annular space 122 of the spacer ring 120. The path area of the path defined by the orifice ring 118 and the spacer ring 120 is small enough to restrict fluid flow therethrough, damping force can be generated.

On the other hand, in the piston rebounding stroke, the pressure in the upper working chamber 20 becomes lower than the pneumatic pressure in the reservoir chamber 16. As a result, the seal ring 116 comes to contact with the flange section 126 of the upper end plug 100 to establish gas tight seal. Therefore, the pneumatic fluid in the fluid reservoir chamber 16 can be prevented from leaking into the upper working chamber.

Figure 6:
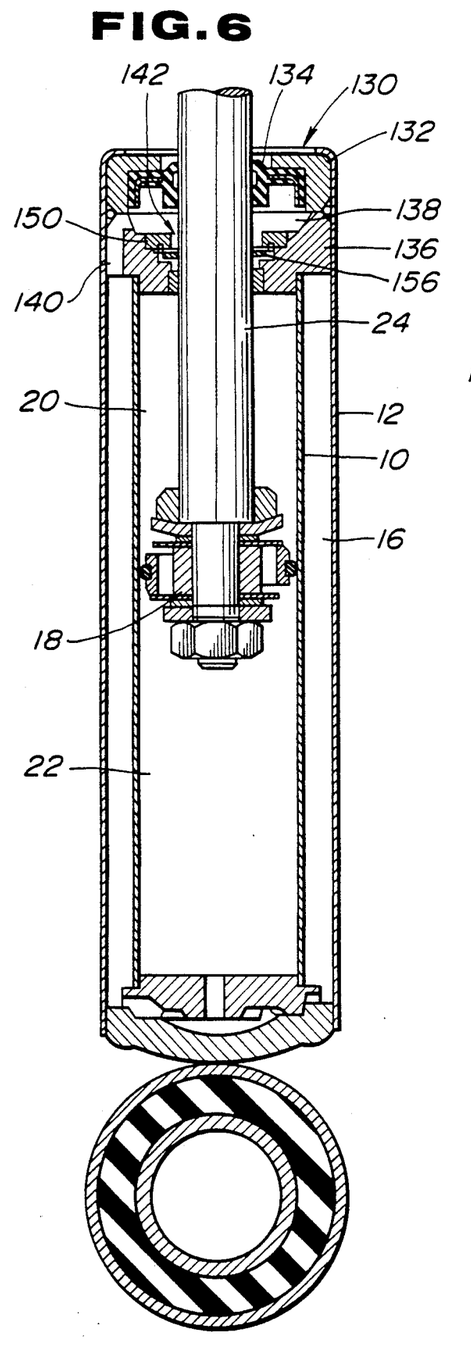
FIG. 6 is a section of the fourth embodiment of a shock absorber according to the invention.
Figure 7:
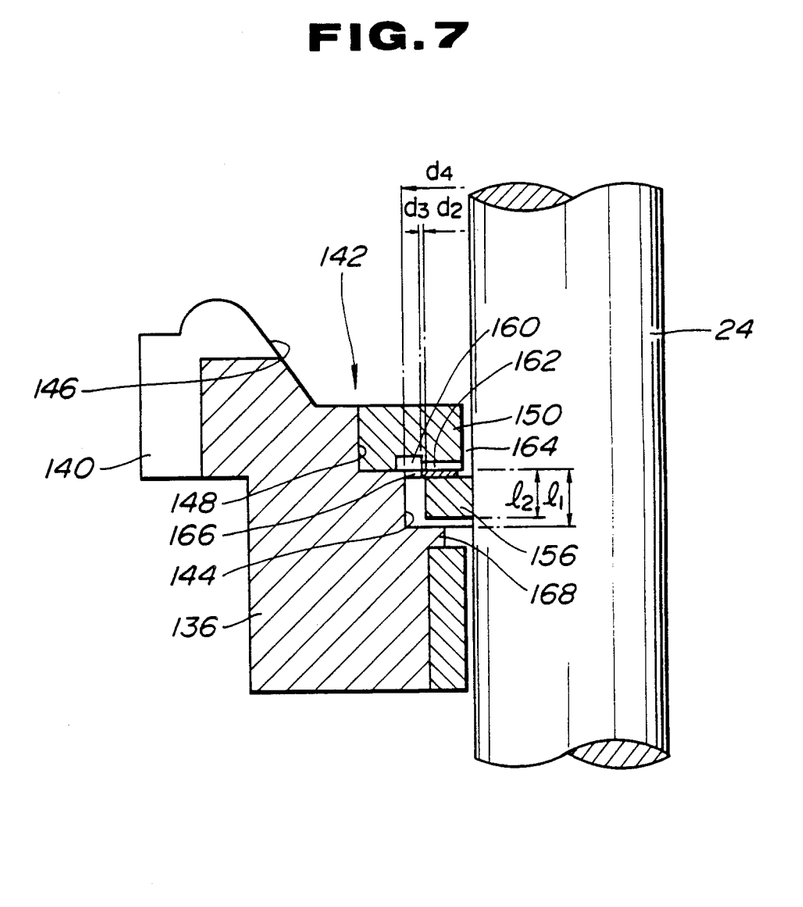
FIG. 7 is an enlarged section of the major part of the fourth embodiment of the shock absorber of FIG. 6.

FIGS. 6 and 7 shows the fourth embodiment of the shock absorber according to the present invention. In this embodiment, a seal assembly 130 which comprises a seal retainer 132 and an elastic seal 134, is engaged to establish liquid and gas-tight seal at the top of the outer cylinder 12. On the other hand, the top end of the inner cylinder 10 is closed by an upper end plug 136. A chamber 138 is defined between the seal assembly 130 and the upper end plug 136. The chamber 138 is constantly in communication with the fluid reservoir 16 via a communication path 140.

The upper end plug 136 serving as the road guide has stepped groove 142 defining the lower most small diameter section 144, an uppermost large diameter section 146 and an intermediate section 148 between the lowermost and uppermost sections 144 and 146. A stationary ring member or retainer 150 is rigidly fitted to the intermediate section 148 and extends radially inward. This stationary ring member 150 is cooperative with the wall section 152 of the upper end plug 136 defining the lowermost section 144 to define a seal receptacle groove 154. In the seal receptacle groove 154, a seal ring 156 is disposed for thrusting movement in axial direction according to pressure difference between the fluid reservoir chamber 16 and the upper working chamber In order to permit thrusting movement, the seal ring 156 has a height $X_1$ smaller than the height $X_2$ of the seal receptacle groove 154. The seal receptacle groove 154 and an orifice ring 158 are also disposed in axial alignment to each other.

Figure 8:
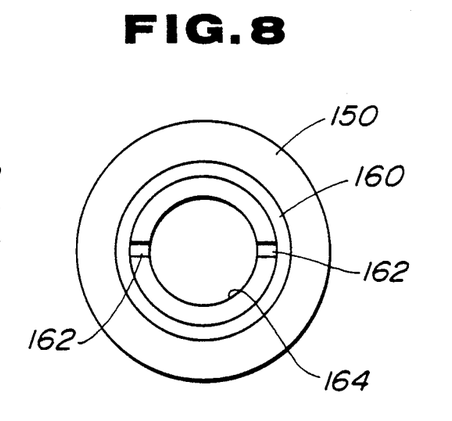
FIG. 8 is a bottom view of a fixing member employed in the fourth embodiment of the shock absorber of FIG. 6.
Figure 9:
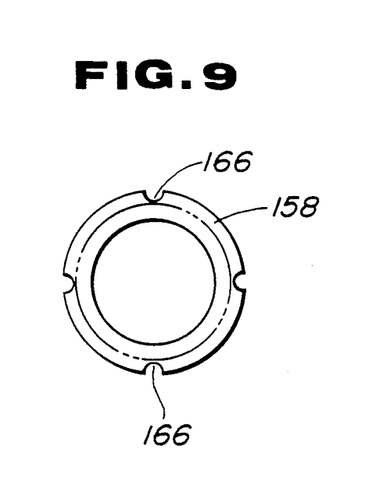
FIG. 9 is a plan view of a sealing member employed in the fourth embodiment of the shock absorber of FIG. 6.

As shown in FIG. 7, an annular groove 160 and one or more radially extending grooves 162 are formed on the lower surface of the stationary ring member 150. The radially extending grooves 162 opens to the fluid path 164 defined between the inner peripheral edge of the stationary ring member 150 and the piston rod 24, and the other end opens to the annular groove 160, as shown in FIG. 8. The inner circumferential edge of the annular groove 160 is so distanced from the axial center as to have greater distance $d_1$ than the radial length $d_2$ of the seal ring 156 and the possible transverse offset magnitude $d_3$ of the seal ring. On the other hand, as shown in FIG. 9, the orifice ring 158 is formed with a plurality of cut-outs 166.

With the grooves 160 and 162 of the stationary ring member 150 and the cut-outs 166 of the orifice ring 158, the flow restricting path for permitting fluid flow from the upper working chamber 20 and the chamber 138 during piston bounding stroke. On the other hand, in the piston rebounding stroke, the seal ring 156 is depressed on the the flange section 168 of the upper end plug for establishing gas tight seal. Therefore, with this construction, substantially the same effect to that obtained from the foregoing third embodiment can be obtained.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A shock absorber comprising:
   a cylinder assembly defining a working chamber filled with a hydraulic working fluid and disposed therein a piston, and a fluid reservoir chamber filled with the hydraulic working fluid and a pneumatic working fluid;
   a communication path for connecting said working chamber and said fluid reservoir chamber for fluid communication therebetween;
   a check and flow restriction assembly disposed within said communication path for selectively establishing and blocking fluid communication between said working chamber and said fluid reservoir chamber, said check and flow assembly including a check means and a flow restriction means arranged in series, said flow restriction means permitting pneumatic and hydraulic fluid flow directed to said fluid reservoir chamber during a piston bounding stroke and providing flow restriction for the hydraulic fluid flow, and said check means blocking fluid communication between said fluid reservoir chamber and said working chamber during piston rebounding stroke and permitting hydraulic fluid flow during said piston bounding stroke;
   said check means including a seal ring; and
   said flow restriction means comprising an orifice extending in an axial direction between the outer periphery of a rod connected to said piston and an inner periphery of said seal ring.

2. A shock absorber comprising:
   a cylinder assembly defining a working chamber filled with a hydraulic working fluid and disposed therein a piston, and a fluid reservoir chamber filled with the hydraulic working fluid and a pneumatic working fluid;
   a communication path for connecting said working chamber and said fluid reservoir chamber for fluid communication therebetween;
   a check and flow restriction assembly disposed within said communication path for selectively establishing and blocking fluid communication between said working chamber and said fluid reservoir chamber, said check and flow assembly including a check means and a flow restriction means arranged in series, said flow restriction means permitting pneumatic and hydraulic fluid flow directed to said fluid reservoir chamber during a piston bounding stroke and providing flow restriction for the hydraulic fluid flow, and said check means blocking fluid communication between said fluid reservoir chamber and said working chamber during piston rebounding stroke and permitting hydraulic fluid flow during said piston bounding stroke; and said check and flow restriction assembly further comprising a seal ring and a retainer, and said flow restriction means comprises a radially extending groove in said retainer for forming a flow restricting orifice.

3. A shock absorber comprising:

a cylinder assembly defining a working chamber filled with a hydraulic working fluid and disposed therein a piston, and a fluid reservoir chamber filled with the hydraulic working fluid and a pneumatic working fluid;

a communication path for connecting said working chamber and said fluid reservoir chamber for fluid communication therebetween;

a check and flow restriction assembly disposed within said communication path for selectively establishing and blocking fluid communication between said working chamber and said fluid reservoir chamber, said check and flow assembly including a check means and a flow restriction means arranged in series, said flow restriction means permitting pneumatic and hydraulic fluid flow directed to said fluid reservoir chamber during a piston bounding stroke and providing flow restriction for the hydraulic fluid flow, and said check means blocking fluid communication between said fluid reservoir chamber and said working chamber during piston rebounding stroke and permitting hydraulic fluid flow during said piston bounding stroke; and said check and flow restriction assembly further comprising a seal ring and a retainer, sand said flow restriction means comprises a plurality of ring members disposed between said seal ring and said retainer for defining a flow restricting orifice.

4. A shock absorber comprising:

a cylinder assembly defining a working chamber filled with a hydraulic working fluid and disposed therein a piston, and a fluid reservoir chamber filled with the hydraulic working fluid and a pneumatic working fluid;

a communication path for connecting said working chamber and said fluid reservoir chamber for fluid communication therebetween;

a check and flow restriction assembly disposed within said communication path for selectively establishing and blocking fluid communication between said working chamber and said fluid reservoir chamber, said check and flow assembly including a check means and a flow restriction means arranged in series, said flow restriction means providing flow restriction against fluid flow therethrough, and said check means being responsive to pressure difference between said working chamber and said fluid reservoir chamber and responsive to higher pressure in said fluid reservoir chamber than that in said working chamber for elastically establishing a flow blocking seal for blocking fluid communication between said fluid reservoir chamber and said working chamber and responsive to higher pressure in said working chamber than that in said fluid reservoir chamber for permitting hydraulic fluid flow; and said check means comprises an elastic seal elastically contacting an inner periphery of said communication path, said elastic seal being designed so that the pressure in said working fluid chamber is exerted onto said seal in a direction for releasing sealing contact between said elastic seal and said inner periphery of said communication path, and the pressure in said fluid reservoir chamber is exerted onto said seal in a direction for urging said seal onto said inner periphery of said communication path.

5. A shock absorber comprising:

a cylinder assembly defining a working chamber filled with a hydraulic working fluid and disposed therein a piston, and a fluid reservoir chamber filled with the hydraulic working fluid and a pneumatic working fluid;

a communication path for connecting said working chamber and said fluid reservoir chamber for fluid communication therebetween; and a check and flow restriction assembly disposed within said communication path for selectively establishing and blocking fluid communication between said working chamber and said fluid reservoir chamber, said check and flow assembly including a check means and a flow restriction means arranged in series, said flow restriction means provided at an orientation closer to said fluid reservoir chamber than said check means and adapted to restrict hydraulic fluid flow therethrough for assisting in the generation of a damping force in said working chamber, and said check means for blocking fluid flow being movable between a first and a second position depending upon a pressure difference between said working chamber and said fluid reservoir chamber, said check means being responsive to a pressure in said fluid reservoir chamber higher than that in said working chamber so as to move.to said first position for blocking communication between said fluid reservoir chamber and said working chamber, and responsive to a pressure in said working chamber higher than that in said fluid reservoir chamber for permitting hydraulic fluid flow therebetween.

6. A shock absorber as set forth in claim 5, wherein said flow restricting means comprises an orifice extending in axial direction defined between an outer periphery of a piston rod and an inner periphery of said check means.

7. A shock absorber as set forth in claim 5, wherein said check means comprises a seal ring.

8. A shock absorber as set forth in claim 5, wherein said check and flow restriction assembly comprises a seal ring and a retainer, and said flow restriction means comprises radially extending grooves cooperative with said retainer for forming a flow restricting orifice.

9. A shock absorber as set forth in claim 5, wherein said check and flow restriction assembly comprises a seal ring and a retainer, and said flow restriction means comprises a plurality of ring members disposed between said seal ring and said retainer for defining a flow restricting orifice.

* * * * *

UNITED STATES PATENT AND TRADEMARK OFFICE
CERTIFICATE OF CORRECTION

PATENT NO. : 4,989,701

DATED : February 5, 1991

INVENTOR(S) : Fumiyuki Yamaoka et al.

It is certified that error appears in the above-identified patent and that said Letters Patent is hereby corrected as shown below:

In column 9, claim 3, line 40, delete "sand" and insert --and-- in its place.

Signed and Sealed this

Fourth Day of August, 1992

Attest:

DOUGLAS B. COMER

*Attesting Officer*   *Acting Commissioner of Patents and Trademarks*